3,360,457
HYDROCRACKING PROCESS

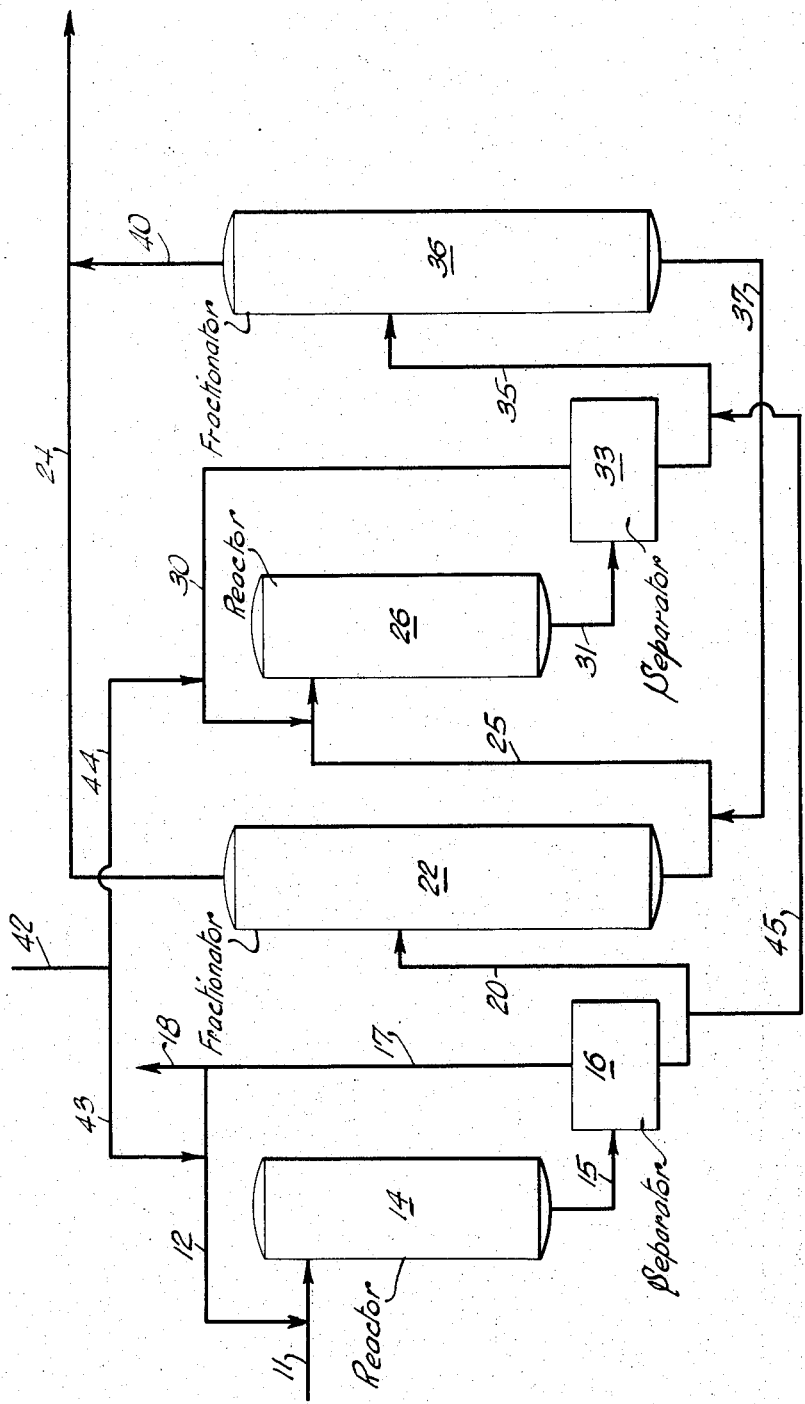

Reese A. Peck and Edward T. Child, Fishkill, and Donald A. Messing, Poughkeepsie, N.Y., assignors to Texaco, Inc., New York, N.Y., a corporation of Delaware
Filed July 1, 1965, Ser. No. 468,746
9 Claims. (Cl. 208—59)

This invention relates to the hydroconversion of hydrocarbons. More particularly, it is concerned with the conversion of heavy hydrocarbon liquids into lighter hydrocarbon liquids. In its more specific aspects it relates to the hydroconversion or hydrocracking of hydrocarbon liquids boiling above about 400° F. into hydrocarbon liquids boiling below about 400° F.

Hydrocracking, that is the cracking in the presence of hydrogen of petroleum hydrocarbons for the production of motor fuels and jet fuels, is well known. It is also known to carry out the reaction in the presence of a catalyst which is conventionally composed of two components, a cracking component which forms the major portion of the catalyst composite and a hydrogenating component which generally is supported on the cracking component. Suitable hydrogenating components comprise the metals of Group VI and Group VIII such as, for example, nickel, iron, tungsten, cobalt, palladium, platinum, molybdenum, their oxides or sulfides, and mixtures thereof. Particularly suitable hydrogenating components comprise nickel and palladium.

The hydrogenating component generally is present in the catalyst composite in an amount between about 0.1 and 40% by weight and is supported on a carrier having cracking activity. Supports such as natural cracking catalysts, synthetic silica alumina, synthetic silica magnesia, montmorillonite clay, alumina gel, silica gel and natural and synthetic zeolites are satisfactory. Advantageously the support is either naturally acidic or has had cracking activity imparted thereto by treatment with an acid such as hydrofluoric acid. A silica-alumina support containing between about 80–90% silica and 10–20% alumina or a synthetic zeolite having a low alkali metal content has been found particularly suitable. The catalysts, depending on their compositions and ruggedness, may be used in fixed, moving or fluidized beds.

In known hydrocracking processes it is customary to pass a feed having an initial boiling point higher than the end point of the desired products into contact with a fixed bed composed of particles of hydrocracking catalyst. The desired fractions are recovered from the reaction products and unconverted or insufficiently converted material may be withdrawn from the system or returned to the reaction zone. For the most part the desired reaction products of a hydrocracking process are motor fuels and jet fuels.

It is an object of the present invention to provide a process for the production of high quality gasoline or motor fuel. It is another object of this invention to provide a two-stage hydrocracking process using a different catalyst in each stage. These and other objects will be evident to those skilled in the art from the following disclosure.

According to the present invention, a hydrocarbon charge stock boiling above the motor fuel range is converted to a motor fuel of high octane number by contacting the charge stock with a hydrocracking catalyst comprising a hydrogenating component in the sulfide form in a first hydrocracking stage and contacting at least a portion of the reaction product boiling above the motor fuel range with a hydrocracking catalyst comprising a hydrogenating component in the unsulfided, that is the metal or metal oxide form in a second hydrocracking stage.

The process of the invention is applicable to hydrocarbon fractions boiling above the motor fuel range, that is boiling above about 400° F. and preferably boiling within the range of about 400–900° F. Suitable charge stocks include straight run gas oils, fluid catalytic cracking cycle gas oils, deasphalted oil, coker gas oils and the like. It is not necessary that the charge to the process of the present invention be nitrogen free. Charge stocks containing up to 1000 p.p.m. nitrogen may be used in the process of the present invention. However, charge stocks containing excessive amounts of nitrogen may be subjected to a preliminary denitrification treatment as by contact with a cobalt molybdate, nickel molybdate or nickel tungstate catalyst in a manner well known in the art. Suitable sources of charge stock are petroleum crude oils, shale oils, tar sand oils, oils derived from coal and the like.

Hydrogen used in the process of the present invention may be obtained from any suitable source. The hydrogen need not be pure but may contain as much as 50% impurities. In this respect the term hydrogen as used in the present specification and claims includes dilute hydrogen. Preferably a gas containing at least about 70% hydrogen is used. Suitable gases are catalytic reformer by-product gas, electrolytic hydrogen and hydrogen produced by the partial oxidation of carbonaceous material followed by shift conversion and $CO_2$ removal. Since the efficiency of the hydrocracking reaction depends to some extent on the partial pressure of the hydrogen, advantageously the efficiency for a given total pressure on the system increases as the hydrogen purity is increased.

The hydrocracking process of the present invention is carried out in two stages. Although the reaction conditions in both stages may be substantially the same preferably the temperatures in the first stage are slightly higher than those in the second stage. For the first stage, temperatures may range from about 600–850° F., a preferred range being from 650–800° F. Pressures may lie within the range of 500–10,000 p.s.i.g., preferably 1000–3000 p.s.i.g. Hydrogen is charged at a rate between 1000 and 20,000 s.c.f. per barrel of hydrocarbon charge, a preferred range being from 3000–8000 s.c.f. per barrel. The liquid hourly space velocity, that is liquid volumes of charge per volume of catalyst per hour, may range from 0.1 to 10, preferably from 0.5 to 2.0. Advantageously, the reaction conditions in the first reaction zone are sufficiently severe to convert at least 20% of the charge to a fraction boiling within the motor fuel range.

In the second reaction zone a preferred temperature range is 550–800° F. although temperatures ranging from 500–850° F. may be used. Hydrogen rates in the second stage for the most part are substantially the same as those in the first stage. Similarly, the broad and preferred ranges for the space velocity and the pressure lie within the same broad and preferred range respectively as those employed in the first stage.

In the two stage hydrocracking process of the present invention a different catalyst is used in each stage. As pointed out above, catalysts used in hydrocracking comprise two components, a hydrogenating component and a cracking component. In the first stage of our process the hydrogenating component is in the sulfided form and in the second stage the hydrogenating component is in the unsulfided form, preferably either in the form of the oxide or of the metal.

The catalyst may be prepared in known manner by impregnating a cracking support with a solution of a soluble salt of the hydrogenating component, drying and calcining. For example, to prepare a nickel tungsten catalyst, a silica-alumina cracking catalyst is impregnated with a solution of soluble nickel and tungsten compounds, dried and calcined or may be contacted with separate solutions with intermediate drying and calcining. The resulting catalyst is in the oxide form and is suitable for use in the second stage. This catalyst may be treated with hydrogen to produce the metal for use in the second stage or with a mixture of hydrogen and a sulfur-producing compound for use in the first stage. For example the calcined form of the catalyst can be treated with a mixture of hydrogen and hydrogen sulfide, carbon disulfide or a low molecular weight mercaptan such as butyl mercaptan at a temperature of about 750° and a pressure of about 300 p.s.i.g. for several hours. When the support is a crystalline molecular sieve the hydrogenating component may be incorporated into the structure of the acid form of the crystalline zeolite by impregnation or by ion exchange. The hydrogenating component may be present in an amount between 0.1 and 40% by weight of the metal based on the total catalyst composite. When the hydrogenating component is a noble metal such as platinum or palladium, it should be present in an amount between 0.1 and 2%. Otherwise, the hydrogenating component is preferably present in an amount between about 5 and 20%.

For a better understanding of the invention reference is made to the accompanying drawing which shows diagrammatically a flow scheme for carrying out the process of the present invention.

A charge stock such as a cycle gas oil is introduced into the system through line 11 and with hydrogen from line 12 passes into reactor 14 where it is contacted in a first stage with the sulfided form of the hydrocracking catalyst. The reaction products then pass through line 15 to separator 16 from which a hydrogen containing gas is removed through line 17, a portion thereof being recycled to first stage reactor 14 through line 12 and the balance being removed from the system through line 18. Liquid from separator 16 passes through line 20 to fractionator 22 from which a fraction containing $C_4$'s and boiling up to about 400° F. is removed through line 24. The 400° F.+ fraction is sent to second stage hydrocracking reactor 26 through line 25. In the case of jet fuel manufacture, the temperatures of fractionator 22 are adjusted to remove through line 24 a fraction boiling up to about 525–550° F.

In second stage reactor 26 the 400° F.+ fraction together with recycle hydrogen from line 30 is brought into contact with a hydrocracking catalyst in the unsulfided form. The reaction products leave through line 31 and are separated in separator 33 into a hydrogen-rich fraction recycled through line 30 and a liquid product fraction which is sent to fractionator 36 by means of line 35. In fractionator 36 material boiling up to about 400° F. is removed overhead through line 40 and a fraction boiling above about 400° F. is returned to the second stage reactor 26 by means of lines 37 and 25.

Make-up hydrogen to replace that bled from the system and that consumed in the process is introduced into the system through lines 42, 43 and 44. If desired, liquid from separator 16 may be sent directly through lines 20, 45 and 35 to fractionator 36 which then serves as a common fractionator for both hydrocracking zones in which case fractionator 22 can be eliminated. To prevent the catalyst in the second stage from becoming sulfided, the second stage hydrogen circulation system is maintained separate from that of the first stage.

The following examples serve to show the superiority of the claimed process over a process in which the sulfided catalyst is used in both stages. In each of the following examples the charge stock is a gas oil having the following characteristics:

| | |
|---|---|
| Gravity, °API | 29.5 |
| Nitrogen, p.p.m. | 67 |
| Sulfur, wt. percent | 0.17 |
| Aromatics vol. percent | 32 |
| ASTM dist., °F.: | |
| IBP–10% | 416–508 |
| 20–30% | 542–568 |
| 40–50% | 590–610 |
| 60–70% | 630–648 |
| 80–90% | 668–696 |
| 95–EP | 712–724 |
| OH, percent | 96 |

In Example I, the catalyst in both stages in sulfided nickel tungsten on silica-alumina containing 6% Ni and 19% W on a support composed of 87% silica and 13% alumina. In effect, Example I represents the conventional single stage process. This catalyst is also used in Stage 1 of each of Examples II and III.

In Example II, the Stage 2 catalyst is the oxide form of the Stage 1 catalyst and in Example III the Stage 2 catalyst contains 6% Ni on a support composed of 87% silica and 13% alumina.

Reaction conditions and results are tabulated below.

EXAMPLE I

| | Stage 1 | Stage 2 [1] | Total |
|---|---|---|---|
| Pressure, p.s.i.g. | 1,500 | 1,500 | |
| Temperature, °F. | 750 | 640 | |
| LHSV, v./hr./v. | 0.75 | 0.8 | |
| Gas recycle Rate, s.c.f.b. | 7,825 | 7,000 | |
| Hydrogen consumption, s.c.f.b. | 1,160 | 2,349 | 2,325 |
| Catalyst | (2) | (2) | |
| Yields, basis fresh feed vol. percent: | | | |
| i-$C_4$ | 3.97 | 9.55 | 9.03 |
| n-$C_4$ | 2.52 | 4.98 | 5.17 |
| i-$C_5$ | 4.0 | 9.00 | 8.77 |
| n-$C_5$ | 1.83 | 3.85 | 3.88 |
| 115–200° F. | 9.85 | 19.00 | 19.93 |
| 200–400° F. | 38.57 | 69.90 | 75.62 |
| 400° F.+ to 2d stage | 53.02 | | |
| Product Quality: | | | |
| 115–400° F. RON (+3 cc. TEL) | 94.6 | 91.4 | |
| 200–400° F. RON (+3 cc. TEL) | 75.5 | 68.8 | |
| Aromatics, vol. percent | 13.8 | 1.0 | |
| N/P ratio | 1.5 | 1.0 | |

[1] Yields based on change to Stage 2.
[2] NiS $WS_2$ on $SiO_2Al_2O_3$.

EXAMPLE II

| | Stage 1 | Stage 2 [1] | Total |
|---|---|---|---|
| Pressure, p.s.i.g. | 1,500 | 1,500 | |
| Temperature, °F. | 750 | 630 | |
| LHSV, v./hr./v. | 0.76 | 1.0 | |
| Gas recycle rate, s.c.f.b. | 7,830 | 6,000 | |
| Hydrogen consumption, s.c.f.b. | 1,151 | 2,218 | 2,251 |
| Catalyst | (2) | (3) | |
| Yields, basis fresh feed vol. percent: | | | |
| i-$C_4$ | 3.94 | 12.29 | 10.46 |
| n-$C_4$ | 2.54 | 4.49 | 4.92 |
| i-$C_5$ | 3.98 | 12.33 | 10.52 |
| n-$C_5$ | 1.86 | 2.31 | 3.09 |
| 115–220° F. | 9.87 | 32.62 | 27.18 |
| 200–400° F. | 38.62 | 62.81 | 71.95 |
| 400° F.+ to 2d stage | 53.06 | | |
| Product Quality: | | | |
| 115–200° F. RON (+3 cc. TEL) | 94.4 | 94.0 | |
| 200–400° F. RON (+3 cc. TEL) | 76.0 | 82.0 | |
| Aromatics, vol. percent | 13.6 | 3.3 | |
| N/P ratio | 1.53 | 1.15 | |

[1] Yields based on change to Stage 2.
[2] NiS WS on $SiO_2Al_2O_3$.
[3] NiO $WO_3$ on $SiO_2Al_2O_3$.

EXAMPLE III

|  | Stage 1 | Stage 2 [1] | Total |
|---|---|---|---|
| Pressure, p.s.i.g. | 1,500 | 1,500 | |
| Temperature, °F | 750 | 647 | |
| LHSV, v./hr./v | 0.75 | 0.98 | |
| Gas recycle rate, s.c.f.b. | 7,810 | 6,275 | |
| Hydrogen consumption, s.c.f.b. | 1,145 | 2,172 | 2,180 |
| Catalyst | (2) | (3) | |
| Yields, basis fresh feed, vol. percent: | | | |
| i-$C_4$ | 3.90 | 15.03 | 11.91 |
| n-$C_4$ | 2.41 | 4.90 | 5.01 |
| i-$C_5$ | 4.05 | 15.67 | 12.21 |
| n-$C_5$ | 1.83 | 0.77 | 2.24 |
| 115–200° F | 9.69 | 22.97 | 21.92 |
| 200–400° F | 38.50 | 63.02 | 72.02 |
| 400° F.+ to 2d stage | 53.0 | | |
| Product Quality: | | | |
| 115–200° F. RON (+3 cc. TEL) | 94.5 | 95.0 | |
| 200–400° F. RON (+3 cc. TEL) | 75.8 | 84.0 | |
| Aromatics, vol. percent | 13.5 | 14.0 | |
| N/P ratio | 1.6 | 0.95 | |

[1] Yields based on change to Stage 2.
[2] NiS WS$_2$ on SiO$_2$Al$_2$O$_3$.
[3] NiO on SiO$_2$Al$_2$O$_3$.

We claim:

1. A process for the conversion of a hydrocarbon fraction into lighter hydrocarbons which comprises contacting a hydrocarbon fraction boiling within the range of about 400–950° F. under hydrocracking conditions with a hydrocracking catalyst comprising a hydrogenating component in sulfide form in a first stage, recovering a motor fuel fraction from the first stage effluent, contacting the entire portion of the reaction product boiling above the motor fuel range under hydrocracking conditions but at a temperature below the temperature of the first stage with a hydrocracking catalyst comprising a hydrogenating component selected from the group consisting of metals and oxides of metals in a second stage and recovering from the second stage effluent a motor fuel fraction having a higher octane number than the motor fuel fraction recovered from the first stage effluent.

2. The process of claim 1 in which the first stage catalyst comprises sulfided nickel and tungsten on a silica alumina support.

3. The process of claim 1 in which the second stage catalyst comprises nickel on a silica-alumina support.

4. The process of claim 1 in which the second stage catalyst comprises nickel and tungsten on a silica-alumina support.

5. The process of claim 1 in which the normally liquid products from the first and second stages are fractionated in a common fractionator.

6. The process of claim 1 in which the hydrocarbon fraction boiling within the range of about 400–950° F. contains at least 10 p.p.m. nitrogen.

7. A process for the conversion of a hydrocarbon fraction into lighter hydrocarbons which comprises contacting a hydrocarbon fraction boiling within the range of about 400–950° F. under hydrocracking conditions with a hydrocracking catalyst comprising a hydrogenating component in sulfide form in a first stage, recovering from the effluent from the first stage a motor fuel fraction and a first fraction boiling above the motor fuel range contacting the entire fraction boiling above the motor fuel range under hydrocracking conditions but at a temperature below the temperature of the first stage with a hydrocracking catalyst comprising a hydrogenating component in unsulfided form in a second stage, recovering from the effluent from said second stage a motor fuel fraction having a higher octane number than the motor fuel fraction recovered from the first stage effluent and a second fraction boiling above the motor fuel range and returning the second fraction boiling above the motor fuel range to said second stage.

8. The process of claim 7 in which the first stage catalyst comprises nickel and tungsten in sulfide form and the second stage catalyst comprises nickel in unsulfided form.

9. The process of claim 8 in which the second stage catalyst comprises nickel and tungsten in unsulfided form.

References Cited

UNITED STATES PATENTS

| | | | |
|---|---|---|---|
| 3,148,136 | 9/1964 | Woodle | 208—72 |
| 3,239,447 | 3/1966 | Reeg et al. | 208—111 |
| 3,245,901 | 4/1966 | Beuther et al. | 208—109 |

ABRAHAM RIMENS, *Primary Examiner.*

D. E. GANTZ, *Assistant Examiner.*